(12) United States Patent
Shah et al.

(10) Patent No.: US 9,774,457 B2
(45) Date of Patent: Sep. 26, 2017

(54) SECURE TIME FUNCTIONALITY FOR A WIRELESS DEVICE

(71) Applicant: InterDigital Technology Corporation, Wilmington, DE (US)

(72) Inventors: Yogendra C. Shah, Exton, PA (US); Inhyok Cha, Seoul (KR)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 15/250,211

(22) Filed: Aug. 29, 2016

(65) Prior Publication Data

US 2016/0373265 A1 Dec. 22, 2016

Related U.S. Application Data

(63) Continuation of application No. 14/298,238, filed on Jun. 6, 2014, now Pat. No. 9,432,362, which is a (Continued)

(51) Int. Cl.
*H04L 29/06* (2006.01)
*H04L 9/32* (2006.01)
(Continued)

(52) U.S. Cl.
CPC .......... *H04L 9/3297* (2013.01); *G06F 21/725* (2013.01); *H04L 9/3234* (2013.01); (Continued)

(58) Field of Classification Search
CPC ...... H04L 63/12; H04L 63/10; H04L 63/0853 (Continued)

(56) References Cited

U.S. PATENT DOCUMENTS 4,509,201 A 4/1985 Sekigawa et al.
5,189,700 A 2/1993 Blandford
(Continued)

FOREIGN PATENT DOCUMENTS

CN 1509546 A 6/2004
CN 1694032 A 11/2005
(Continued)

OTHER PUBLICATIONS

Hamadeh, "Area Energy and time Assessment for a Distributed TPM for Distributed Trust in IoT clusters", 2015, IEEE, p. 225-230.*
(Continued)

*Primary Examiner* — Taghi Arani
*Assistant Examiner* — Gregory Lane
(74) *Attorney, Agent, or Firm* — Baker & Hostetler, LLP

(57) ABSTRACT

The present invention is related to a wireless transmit/receive unit (WTRU) for providing advanced security functions. The WTRU includes trusted platform module (TPM) for performing trusted computing operations; and a secure time component (STC) for providing a secure measurement of a current time. The STC and the TPM are integrated to provide accurate trusted time information to internal and external to the WTRU. The STC may be located on an expanded a subscriber identity module (SIM), on the WTRU platform, or two STCs may be used, one in each location. Similarly, the TPM may be located on an expanded SIM, on the WTRU platform, or two TPMs may be used, one in each location. Preferably, the STC will include a real time clock (RTC); a tamper detection and power failure unit; and a time report and sync controller.

16 Claims, 8 Drawing Sheets

Related U.S. Application Data continuation of application No. 11/745,697, filed on May 8, 2007, now Pat. No. 8,756,427.

(60) Provisional application No. 60/798,987, filed on May 9, 2006, provisional application No. 60/826,653, filed on Sep. 22, 2006, provisional application No. 60/910,471, filed on Apr. 6, 2007.

(51) Int. Cl.
*G06F 21/72* (2013.01)
*H04W 12/10* (2009.01)
*H04W 12/12* (2009.01)

(52) U.S. Cl.
CPC .......... *H04L 63/0853* (2013.01); *H04L 63/12* (2013.01); *H04W 12/10* (2013.01); *H04L 63/10* (2013.01); *H04L 63/126* (2013.01); *H04L 2463/101* (2013.01); *H04L 2463/102* (2013.01); *H04W 12/12* (2013.01)

(58) Field of Classification Search
USPC .................................................. 713/176, 178
See application file for complete search history.

(56) References Cited

U.S. PATENT DOCUMENTS

| | | | |
|---|---|---|---|
| 5,224,166 A | 6/1993 | Hartman, Jr. | |
| 6,205,550 B1 | 3/2001 | Nardone et al. | |
| 6,357,007 B1 | 3/2002 | Cromer et al. | |
| 6,543,686 B1 | 4/2003 | Ritter | |
| 6,938,178 B2 | 8/2005 | Yano | |
| 7,039,815 B1 | 5/2006 | Grassl et al. | |
| 7,065,656 B2 | 6/2006 | Schwenck et al. | |
| 7,367,063 B1 | 4/2008 | O'Toole, Jr. | |
| 7,409,557 B2 | 8/2008 | Teppler | |
| 7,512,398 B2 | 3/2009 | Chambers et al. | |
| 7,779,252 B2 | 8/2010 | O'Brien et al. | |
| 7,802,112 B2 | 9/2010 | Yasaki et al. | |
| 7,894,808 B2 | 2/2011 | Nakayama et al. | |
| 7,900,058 B2 | 3/2011 | Mabayoje et al. | |
| 8,327,448 B2 | 12/2012 | Eldar | |
| 8,438,645 B2 | 5/2013 | Jain et al. | |
| 8,533,851 B2 | 9/2013 | Ginter et al. | |
| 2002/0080974 A1 | 6/2002 | Grawrock | |
| 2003/0009683 A1 | 1/2003 | Schwenck et al. | |
| 2003/0217309 A1 | 11/2003 | Lodrige | |
| 2004/0021577 A1* | 2/2004 | Lelecas ................ G08B 21/185 340/654 |
| 2005/0005114 A1 | 1/2005 | Medvinsky | |
| 2005/0010774 A1 | 1/2005 | Rose et al. | |
| 2005/0038757 A1 | 2/2005 | Wada | |
| 2005/0050363 A1 | 3/2005 | Naka et al. | |
| 2005/0059352 A1 | 3/2005 | Mclean | |
| 2005/0108171 A1 | 5/2005 | Bajikar et al. | |
| 2005/0108532 A1 | 5/2005 | Bajikar | |
| 2005/0257073 A1 | 11/2005 | Bade et al. | |
| 2006/0041511 A1 | 2/2006 | Ahn | |
| 2006/0053294 A1 | 3/2006 | Akenine | |
| 2006/0080536 A1* | 4/2006 | Teppler ................. H04L 9/12 713/176 |
| 2006/0253894 A1* | 11/2006 | Bookman ........... H04L 63/0428 726/2 |
| 2006/0256907 A1 | 11/2006 | Stalker et al. | |
| 2006/0291483 A1 | 12/2006 | Sela | |
| 2006/0294593 A1* | 12/2006 | Eldar ................... G06F 21/725 726/26 |
| 2007/0123298 A1 | 5/2007 | Zhu et al. | |
| 2007/0124819 A1 | 5/2007 | Strohwig et al. | |
| 2007/0223689 A1 | 9/2007 | O'Brien et al. | |
| 2007/0226390 A1 | 9/2007 | Erny et al. | |
| 2007/0226805 A1 | 9/2007 | Jeal et al. | |
| 2007/0226807 A1 | 9/2007 | Ginter et al. | |
| 2008/0060068 A1 | 3/2008 | Mabayoje et al. | |
| 2008/0068513 A1 | 3/2008 | Ariyoshi et al. | |

FOREIGN PATENT DOCUMENTS

| | | |
|---|---|---|
| CN | 1874317 A | 12/2006 |
| CN | 1906560 A | 1/2007 |
| EP | 0635790 A1 | 1/1995 |
| EP | 0965902 A2 | 12/1999 |
| EP | 1089219 A2 | 4/2001 |
| EP | 1480174 A1 | 11/2004 |
| EP | 1655448 A2 | 5/2006 |
| JP | H06-085666 A | 3/1994 |
| JP | 06-112937 A | 4/1994 |
| JP | 07-36559 A | 2/1995 |
| JP | 11-067614 A | 3/1999 |
| JP | 2000-311196 A | 7/2000 |
| JP | 2001-147860 A | 5/2001 |
| JP | 2002-243875 A1 | 8/2002 |
| JP | 2004-171544 A | 6/2004 |
| JP | 2005-63079 A1 | 3/2005 |
| JP | 2005-079912 A | 3/2005 |
| JP | 2005-159905 A1 | 6/2005 |
| JP | 2006-505074 A | 2/2006 |
| JP | 2006-506755 | 2/2006 |
| JP | 2006-506756 | 2/2006 |
| JP | 2006-080636 A | 3/2006 |
| WO | WO 2004-036513 A1 | 4/2004 |
| WO | WO 2004-075525 A1 | 9/2004 |
| WO | WO 2005-062855 A2 | 7/2005 |
| WO | WO 2006-117009 A1 | 11/2006 |

OTHER PUBLICATIONS

Chinese Application No. 201210568022: Second Office Action dated Dec. 7, 2015, 10 pages.
Eiji Okamoto, Introduction to Encryption Theory, 1st Edition, Kyoritsu Shuppan Co., Ltd., Feb. 25, 1993, pp. 129-131, (No English translation available).
English Translation of Japanese Patent Application No. 2013-226869: Official Notice of Rejection dated Sep. 30, 2014, 4 pages.
Japanese Application No. 2013-226869: Notice of Final Decision of Rejection dated Oct. 27, 2015.
Java™ Verified Program, Technical Topics, "Topic 1: The Java Verified Program and MIDP 2.0 Security", http://iavaverified.com/docs/Technical-Topics-01-2.pdf; Nov. 2004.
LaPolla, "A Survey on Security for Mobile Devices", Feb. 5, 2013, IEEE, p. 446-471.
Open Mobile Alliance, "ORM Architecture", Draft Version 2.0, OMA-DRM•ARCH-V2_0-20040820-C, Aug. 20, 2004.
Open Mobile Alliance, "ORM Specification", Candidate Version 2.0, OMA-TS-DRM•DRM-V2_0-20050614-C, Jun. 14, 2005.
Roger L. Kay, "How to Implement Trusting Computing—A Guide to Tighter Enterprise Security", Endpoint Technologies Associates, 2006.
Schellekens, "Remote Attestation on Legacy Operating Systems with Trusted Platform Modules", Electronic Notes in Theoretical Computer Science, Feb. 2008, p. 59-72.
Trusted Computing Group, "Design, Implementation, and Usage Principles for TPM-Based Platforms", Version 1.0, May 2005.
Trusted Computing Group, "TCG Mobile Trusted Module Specification", Specification Version 0.9, Revision 1, Sep. 12, 2006.
Trusted Computing Group, "TCG Mobile Trusted Module Specification", Specification Version 1.0, Revision 1, Jun. 12, 2007.
Trusted Computing Group, "TCG Specification Architecture Overview", Specification Revision 1.4, Aug. 2, 2007.
Trusted Computing Group, "TCG Specification Architecture Overview", Specification Revision 1.2, Apr. 28, 2004.
Trusted Computing Group, "TPM Main Part 1 Design Principles", Specification Version 1.2, Revision 85, Feb. 13, 2005.
Trusted Computing Group, "TPM Main Part 2 TPM Structures", Specification Version 1.2, Revision 62, Oct. 2, 2003.

(56) References Cited

OTHER PUBLICATIONS

Trusted Computing Group, "TPM Main Part 3 Commands", Specification Version 1.2, Level 2 Revision 85, Feb. 13, 2005.
Vardakas, "Performance Evaluation of Power Demand Scheduling Scenarios in a Smart Grid Environment", Mar. 15, 2015, Applied Energy, p. 164-178.
Walker et al. "The Mobile as a PC—Security Threats and Opportunities", Vodafone Group Research and Development, IEE Security Conference, Sep. 15, 2005.
Japanese Patent Application No. 2016-037918: Notice of Allowance dated Mar. 27, 2017, 6 pages.

* cited by examiner

SECURE TIME FUNCTIONALITY FOR A WIRELESS DEVICE

CROSS REFERENCE TO RELATED APPLICATIONS

This application is a continuation of U.S. application Ser. No. 14/298,238, filed Jun. 6, 2014, which is a continuation of U.S. application Ser. No. 11/745,697, filed May 8, 2007 which claims the benefit of U.S. provisional application No. 60/798,987 filed on May 9, 2006, U.S. provisional application No. 60/826,653 filed on Sep. 22, 2006, and U.S. provisional application No. 60/910,471 filed on Apr. 6, 2007, all of which are incorporated by reference as if fully set forth.

FIELD OF INVENTION

The present invention is related to wireless communication systems. More particularly, the present invention is related to secured time functionality on a wireless device.

BACKGROUND

With the pervasive growth of the wireless industry, the emergence of wireless communications devices, which provide multi-functionality, is expected to grow. The smart phone market is in its early stages of adoption and provides many features such as access to corporate information systems (email and intranet access) and connectivity to intern& based services. Many of these features require storage of sensitive corporate and personal information on the device itself. Additionally, the growth of content based services such as digital rights management (DRM) imposes additional requirements on these devices to ensure that the content stored on the device is accessed by authorized users and according to the terms of the content provider. Typically, the content is delivered over a wireless network and may be accessed at times when the connection to the network is not present. Thus, there is a growing need to ensure that the content is being accessed in a trusted manner and in accordance with the usage rules which may include date and time based limits. In order to rely on time based trust mechanisms, an accurate and secure source of time is needed.

In the prior art, the mechanism to validate time information has been through verification by trusted third parties in the case of secure transactions, and through inherent trust in the device capability to supply time information, for resident applications. Recently, trusted computing techniques have appeared in literature and in products under the technical umbrella of the Trusted Computing Group (TCG).

The TCG has defined a Trusted Platform Module (TPM) for carrying out trusted computing operations. The TPM is a microcontroller that stores keys, passwords, performs ciphering and hashing functions, and forms the basis of a root of trust mechanism. It potentially can be used in any computing device or platform that requires these functions, particularly a wireless transmit/receive unit (WTRU). The nature of the TPM ensures that the information stored and processed there is made more secure from external software attack and physical theft. Security processes, such as authentication, signing and key exchange, are protected through the secure TCG subsystem in the TPM. Access to data and secrets in a TPM and the device it resides on could be denied if the boot sequence is not as expected. Critical applications and capabilities such as secure email, secure web access and local protection of data are thereby made much more secure with the TPM.

A TPM can perform several functions useful in carrying out trusted computing and wireless communications. For example, a TPM can secure binding of the TPM to the platform it resides on via the use of endorsement key (EK) and attestation identity keys (AIKs). Additionally, a TPM may secure binding, sealing and signing of data to secure keys protected by the TPM itself. A TPM may also perform privacy-protected authentication and attestation of the platform as well as remote attestation of the state of the platform through comparative verification of the contents of the platform configuration registers (PCRs) and the hash of stored memory logs (SMLs). Finally, a TPM may perform verification, control, and knowledge-transfer of the integrity, or the 'trustworthiness', of the platform (on which the TPM sits) and its software (SW), including the boot-up codes, the operating system (OS), drivers and applications.

A platform that has a TPM bound on it can be used to provide many useful "secure" applications. Some of the uses that have been identified by the TCG for a mobile phone with a TPM device on it include: secure boot, device authentication, robust DRM, device personalization, secure software download, mobile ticketing and payment, platform integrity checking and remote attestation, and user data confidentiality and privacy protection. However, some of these potential applications rely on obtaining a secure time from an external secure time component.

FIG. 1 shows a typical architecture for a Secure Time Component (STC). An STC is generally defined as a timing device that can present an unequivocal, non-alterable and non-repudiatable certificate of the current time—also known as a signed time certificate. The STC is also configured to resist external attempts to compromise the device's internal operations, internal records, or the signed time certificate outputs given by the device.

The generation of a valid signed time certificate by an STC is a two step process. First, the STC must produce the signed certificate, and then an outside source must verify the validity of the signed certificate.

The operations of a generic STC to produce a signed certificate are described as follows. First, a request for a signed time certificate is input and buffered into the STC. Next, a cryptographic one-way hash (such as SHA-1, MD5, SHA-256, etc.) is generated from the buffered data. Then the current date and time, preferably in a Universal Time Coordinate (UTC) format is read from a real-time clock (RTC) securely (i.e., In a tamper-evident and/or tamper-resistant way) within the device. Finally, a certificate is generated containing the hash, current date and time, and optionally a device serial number and any other audit logs. The certificate is signed using a private key stored within the device. The signature is appended to the certificate and presented as a combined output. It should be noted that the real-time clock will need an externally provided time re-synchronization input. The Internet Engineering Task Force (IETF) secure Network Time Protocol (NTP) is an example of a well known method whereby such re-synching signals can be distributed and processed over an IP-based network.

Verification of the signed time certificate by an outside 'verifier' of the time certificate includes two verification steps. First, the signed time certificate is verified using the device's public key. If the signature does not match, then the certificate is deemed invalid. Second, a hash stored in the certificate is verified by calculating a new hash from the data. If the two hash values do not match, then the verifier can assume that either (1) the certificate does not belong to that particular data file, or (2) the data file has been altered. In either case, the verifier must deem the certificate as being invalid. If both verifications succeed, then the date and time is read from the certificate and assumed to be trustworthy.

The STC itself may be secure, but its output, i.e. the time of the event, will no longer be secure once it is outside the STC. It may, for example, be altered by an unsecured program or tampered while stored in unsecured memory. Therefore, the use of hashing and signing to verify a signed time certificate secures the time information output, after it is provided by the STC. Either symmetric keys or a public-private key pair may be utilized by the secure time component depending upon the application.

One of the most important features of an STC is non-repudiation. A signed time certificate is understood to be an undeniable proof of the date and time that the data was notarized, and the specific secure time device (as identified by its unique serial number, etc.) that was used to perform the time certification.

Several techniques have been proposed in the prior art in order to strengthen the security of the operations of the STC and to ensure the non-repudiation of the time certificate and the ID of the used STC. These techniques include using cryptographic digital signature algorithms, using clocks with software executed in a protected environment, using techniques for tamper resistance to the clock, using clock device identification that is cryptographically protected, protecting HW of keys used in signing the time certificates, and using the secure time servers for re-synching the time on the device clock.

A secure time server is defined herein as a network-based server that, upon request by a client on the network, securely provides a reference time to the requesting client over the network. A secure time server will typically use a secure network-based time synchronization protocol such as the Secure NTP.

Within phones that are compliant with the third generation partnership project (3GPP) standards, the user services identity module (USIM) UICC may provide authentication services to the network or service provider. It would be desirable to combine the platform security functionalities of a TPM, the secure authentication functions of a USIM module, a real time clock (RTC) and time measuring, reporting and stamping software in a secure common package. Further, It would be desirable to improve the 3GPP authentication protocols to include time information and hence provide an opportunity for the local time to be verified or synchronized with the network time.

A similar need for secured time and TPM capabilities exists in DRM devices. The Open Mobile Alliance (OMA) DRM 2.0 specification assumes the existence of a reliable time source that will provide the DRM Time. Practical DRM devices are typically only equipped with inexpensive, real-time clocks which are typically not very accurate, and are not protected or tamper-resistant. Another problem is that the current OMA DRM protocol leaves room for improvements in time-information processing for the DRM application. First, how existing time-related information covered by the DRM application is defined, processed, and communicated with, can be improved. Secondly, there are also areas where new definitions of time-related information can be utilized to enable more reliable and secure DRM processing.

Another problem is that DRM devices that are connected devices have the capability to re-synchronize their local clock, and they will use the resultant DRM time as a reference time supplied by the RI, even though it may have originated from an online certificate status protocol (OCSP) service responder. Since OCSP responders are trusted entities in the OMA DRM schemes, at least these connected DRM devices can re-calibrate their time information correctly. However, even here there are issues. Currently, the OCSP response takes place only when the RI ' decides' that the device's DRM time is not correctly synchronized. If a malignant entity compromises the DRM SW, the RI cannot find out about the compromise in DRM Time on the device, and the OCSP response may not even take place.

Another problem is that clocks within DRM devices could also be synchronized separately from DRM processing. For example the clocks could be synchronized by a communication with a network timing source that is separate from the RI through a time resynchronization protocol such as the IETF NTP. However, although there are securitized network timing protocols, such as the IETF Secure NTP protocol, timing information thus obtained ensuing a secure NTP protocol could subsequently be compromised once it is stored in the DRM device. This can potentially lead to unauthorized use and re-distribution of DRM content.

Another problem is that even if the DRM SW (the DRM UA on the Device, the RI's DRM SW) is secure and uncompromised, other, malicious or compromised SW applications could access such time-related resources or their outputs and mis-use them.

It should be noted here that the problem of "integrity maintenance" of the time information can be somewhat ameliorated by a straightforward use of the prior art of trusted computing techniques. Some work in the prior art has looked at such straightforward application of TPM to general problems of SW integrity checking and permission of the application to run only after the SW's integrity is checked using the TPM. For example, in the context of mobile phone devices there is a possible application of a TPM-equipped mobile phone device to make the DRM application more robust by exploiting TCG techniques, including methods that use the procedure of the 'TPM sealing' and the memory 'blobs' to securely store DRM-related data, after ROAP protocol processing, using TCG keys, and in TPM and storage areas with key protection.

However, a straightforward application of TCG techniques of the prior art has not addressed methods that specifically and systematically increase the confidentiality and integrity of DRM time on a device that has a TPM, nor any methods securitizing the time information on a RI that is equipped with a TPM.

For all of the above stated reasons, a method for providing secured time functionality to WTRUs or other user devices with, and without, DRM capabilities is needed.

SUMMARY

The present invention is related to providing advanced security functions in a WTRU. The WTRU includes a TPM for performing trusted computing operations; and an STC for providing secure and accurate measurements of time. The STC and the TPM are integrated to provide accurate trusted time information for applications internal and external to the WTRU. The STC may be located on an expanded SIM, on the WTRU platform, or two STCs may be used, one in each location. Similarly, the TPM may be located on an expanded SIM, on the WTRU platform, or two TPMs may be used, one in each location.

Preferably, the STC will include a real time clock (RTC); a tamper detection and power failure unit; and a time report and sync controller. The tamper detection and power failure unit will be configured to detect tampering and also save information relating to the RTC, in the event of, for example, a power failure, in an audit log. The time report and sync controller will be configured to provide secured time measurements. Optionally, the time report and sync controller may re-synchronize the RTC to a trusted secure external time source.

In another embodiment, the WTRU is a DRM device. The secured time information is used to add secure time information to existing DRM parameters used for processing DRM data and used in DRM protocols. Additionally, the present invention proposes several new DRM parameters that require an STC to be located on the DRM device.

BRIEF DESCRIPTION OF THE DRAWINGS

A more detailed understanding of the invention may be had from the following description of a preferred embodiment, given by way of example and to be understood in conjunction with the accompanying drawing(s) wherein.

DETAILED DESCRIPTION OF ILLUSTRATIVE EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, a mobile phone platform, a DRM device, or any other type of user device capable of operating in a wired or wireless connected environment. When referred to hereafter, the terminology "base station" includes but is not limited to a Node-B, a site controller, an access point (AP), or any other type of network interfacing device capable of operating in a wired or wireless connected environment. When referred to hereafter, the terminology "SIM" includes a SIM ICC, a USIM, Universal Integrated Circuit Card (UICC), Removable User Identity Module (RUIM), or any other removable media containing WTRU identity information.

Figure 1:
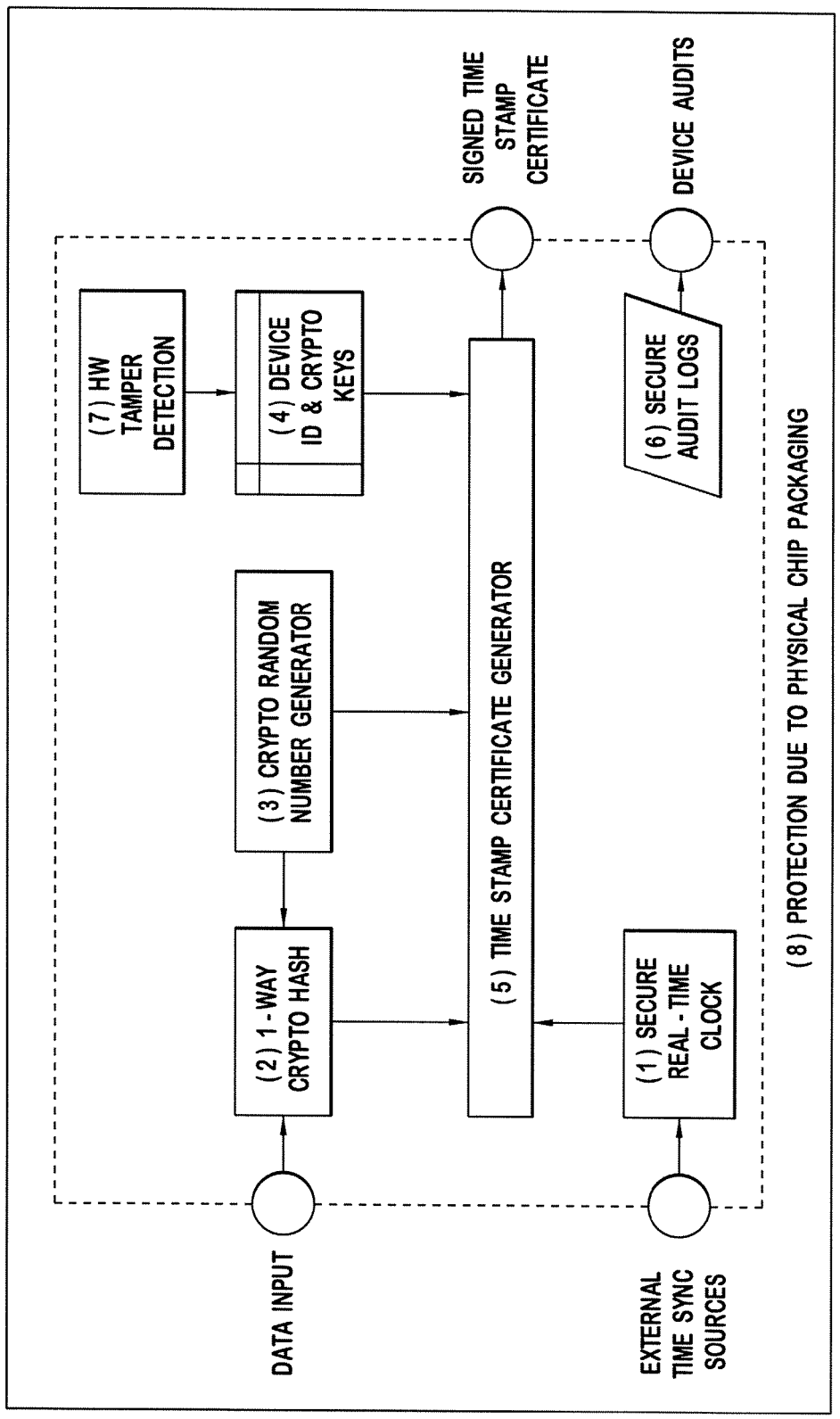
FIG. 1 shows a typical architecture for an STC.
Figure 2:
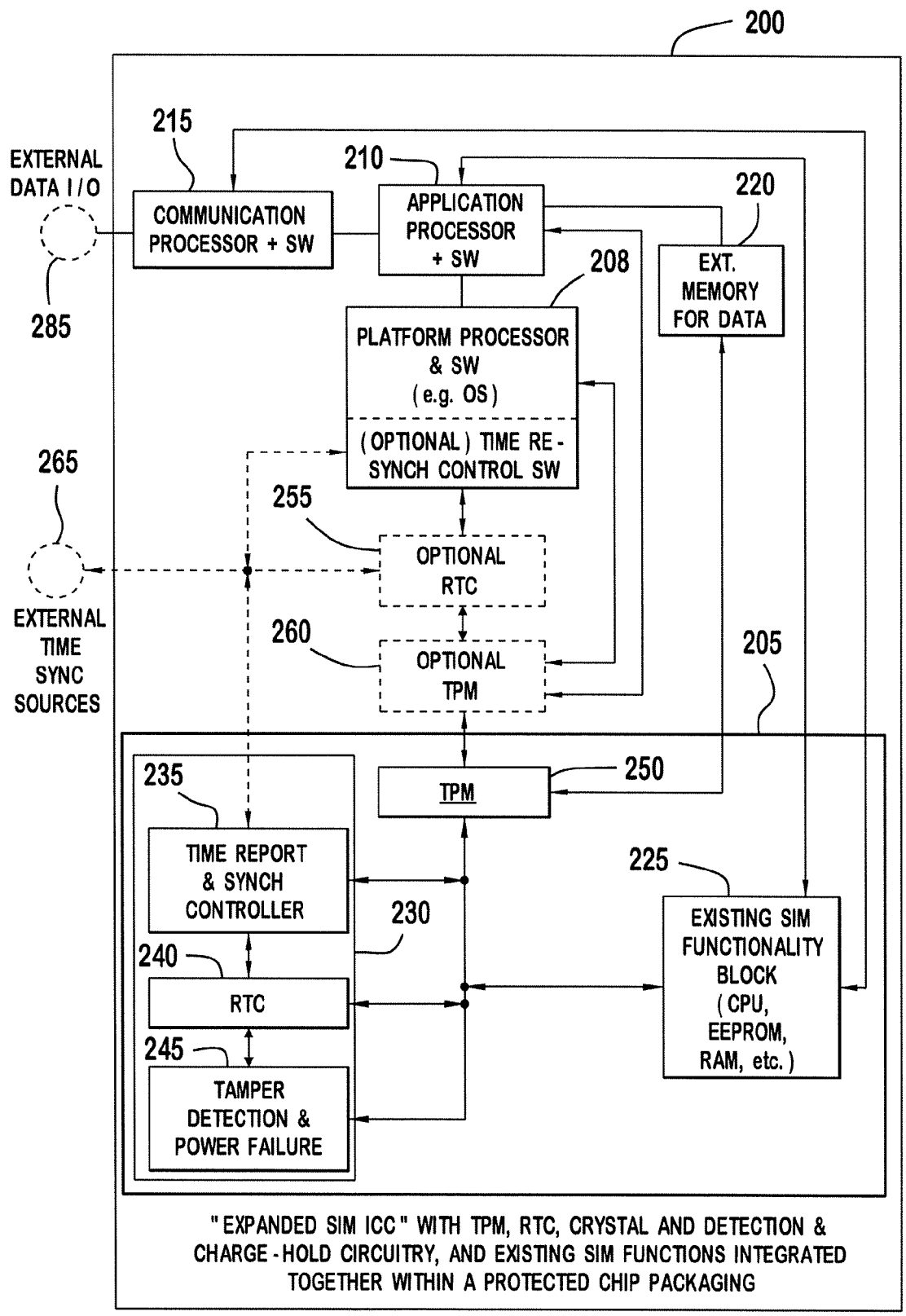
FIG. 2 shows an exemplary diagram of a WTRU configured in accordance with the present invention.

FIG. 2 shows an exemplary WTRU 200 configured in accordance with the present invention. The WTRU 200 includes an expanded SIM ICC 205, a platform processor 208, an application processor and SW 210, a communication processor 215, and external memory for data 220.

The expanded SIM ICC 205 includes a SIM functionality block 225 configured for performing the generally known functions of a generic SIM ICC. Additionally, the expanded SIM ICC 205 of the present invention includes an STC 230.

The STC 230 includes a time report and synch controller 235, an RTC 240, and a tamper detection and power failure unit 245. Also included on the expanded SIM ICC 205 is a TPM unit 250.

The existing SIM functionality block 225 located on the expanded SIM ICC 205 is configured to hold the master secrets used to identify the phone and to provide authentication services for supporting the establishment of a secure channel between the WTRU and the network. The root identity is held securely within the device and never divulged outside of the secure or trusted domain of the SIM. The existing SIM block 225 also performs functions and algorithms needed for 3GPP Authentication and Key Agreement (AKA) related procedures.

The time report and synch controller 235, the RTC 240, and the tamper detection and power failure unit 245 make up the STC 230 located on the expanded SIM ICC 205. The STC 230 is configured to provide a secure record of the time of certain events, or data entries, in the form of a time certificate or signatures of time related data, as outputs to a requesting entity.

The time report and synch controller 235 is configured to control the functions of the RTC 235 and the tamper detection and power failure unit 245. Additionally, the time report and synch controller 235 may be linked to the existing SIM functionality block 225, the external time sync source 265 and the platform processor 208. When time report and synch controller 235 is linked to the existing SIM functionality block 225, the SIM block 225 will be able to utilize secure measurements of time in its databases such as those for phone books.

The RTC 240 may include a quartz crystal oscillator. However, one of skill in the art would recognize that other accurate time keeping devices could be used in the RTC 240 of the present invention. In another embodiment of the present invention, the expanded SIM ICC 205 may be configured such that physically removing the RTC crystal would render the expanded SIM ICC 205 inoperable. This feature may also be incorporated in the tamper detection and power failure unit 245.

The tamper detection and power failure unit 245 is configured to provide a means of maintaining the secure nature of the STC 230 in the event of a power failure. The unit may include a power connection to provide power to the TPM and RTC. The unit 245 may also include tamper detection circuitry to trigger an alarm if tampering is detected. The tamper detection portion of the unit may also include tamper prevention features for preventing hardware and software level tampering. The power failure portion of the unit 245 may also include a capacitor or other short-term energy holding component, configured to hold enough energy to enable retention for a period of time long enough for saving of the RTC contents to a memory in the event of a power failure.

The TPM 250 is also located on the expanded SIM ICC 205 and is linked to both the existing SIM functionality block 225 and the STC 230. By placing both the TPM 250 and the STC 230 on the expanded SIM ICC 205, the SIM ICC 205 is configured to protect and provide core root of trust for the time information produced by the STC 230, and to provide trust measurement capability. The presence of a TPM 250 also can ensure that the time records produced by the RTC 240 and associated time reporting and re-synch controller 235 are stored in protected memory. The protected memory may be located either inside the non-volatile memory in the TPM itself, or in memory external to the TPM but protected with encryption by TPM. Such protection of the time records will also be applicable to the case of a power failure. When the power failure unit 245 alerts the TPM 250 of the power failure, the TPM 250 retrieves the last storable time record from time report and re-synch controller 235 before the energy-holding device inside the power failure unit 245 runs out of power.

Several features are possible with the configuration of the present invention. For example, the expanded SIM ICC 205 of the present invention may provide a measure of the current time to an external requesting application either directly, or through the authentication procedure. This current time is useful in authenticating a device to an external network or for an external network to securely provide the current time, for synchronization.

The expanded SIM ICC 205 may also cryptographically secure and bind time information to a device with a digital signature. Alternatively, the expanded SIM ICC 205 may secure and bind time information through encryption where an encryption key is used to bind a device. The storage of secure information controlled by the expanded SIM ICC 205 can be inside the expanded SIM ICC 205, or outside of the SIM ICC 205, but inside the phone's external memory 220, or both.

The expanded SIM ICC 205 may be used to provide mechanisms to enhance existing applications performed by the SIM functionality block 225. For example, it would be useful to provide secure time stamps for phone book applications and data, mobile payment or ticketing applications and related data, authentication and key management functions, or data related to mobile communication protocol stacks. Additionally, the expanded SIM ICC 205 may have many practical applications to DRM which are discussed later in this application.

Optionally, the WTRU 200 may include a second RTC 255 that is not on the expanded SIM ICC 205. The second RTC 255 will be connected to the platform processor 208 which may contain optional time report and sync control SW 257. The combination of the second RTC 255 and the optional report and sync control SW 257 creates optional STC functionality on the WTRU 200. Further, the second RTC 255 on the platform may be used for applications that may not require the same level of high security as may be required for the first STC 230 that is more heavily protected inside the expanded SIM ICC 205. An example of such applications that require less security may be used for the tick counter for the OS or for casual calendar or stop-watch applications.

Optionally, the WTRU 200 may also include a second TPM unit 260 that is not on the expanded SIM ICC 205. This second TPM unit 260 will be connected to the expanded SIM ICC 205 in order to provide additional security functions. For example, since the SIM ICC 205 can be extracted, the TPM on each device (SIM ICC and platform) can act as the root of trust for that device. Therefore the second TPM 260 can use the slave TPM 250 in the SIM ICC 205 to verify its functionality and indeed perform a mutual authentication to bind the communications channel (interface) between the platform and the SIM ICC 205.

Figure 3:
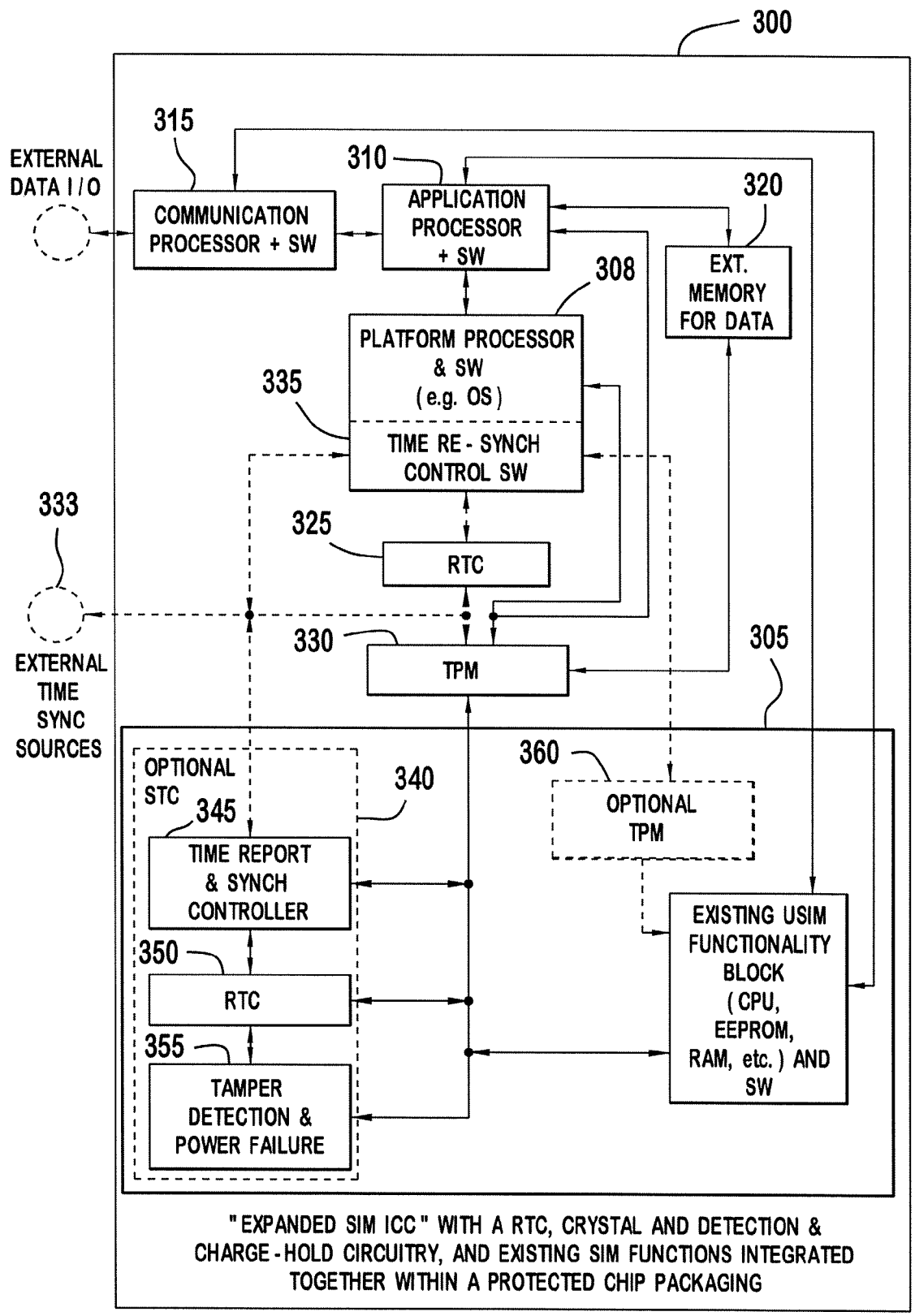
FIG. 3 shows another exemplary diagram of a WTRU configured in accordance with the present invention.

FIG. 3 shows another exemplary WTRU configured in accordance with the present invention. The WTRU 300 includes a generic SIM ICC 305, a platform processor 308, an application processor and SW 310, a communication processor 315, an external memory for data 320, an RTC 325, and a TPM 330.

The WTRU of FIG. 3 is distinguished from the WTRU of FIG. 2 as the RTC 325, and the TPM 330 are located on the WTRU platform, and not on the SIM ICC 305. The RTC 325 may be linked to an external time sync source 333 and the platform processor 308. The platform processor 308 includes time report and sync control software 335 for controlling the RTC 325. Therefore the platform processor and the RTC 325 combine to serve as an STC for the WTRU 300.

By placing the RTC and the TPM on the WTRU platform rather than on the SIM ICC 305, the WTRU 300 will be compatible with generic SIM ICCs. This embodiment still provides secure time component features as described in the description of the expanded SIM ICC 205 of FIG. 2. For example, the TPM 330 on the WTRU platform can perform procedures to protect and enhance the security of the RTC 325, the time-reporting and re-synching application, and the time-record outputs produced. In an alternative embodiment, the WTRU 300 may be configured to operate without the SIM ICC 205. An example of such an embodiment would be a WTRU for a non-3GPP mobile phone.

Optionally, the WTRU 300 may be configured for use with an expanded SIM ICC by including an optional STC 340 on the SIM ICC. This optional STC 340 on the SIM ICC 305 may include a time report and re-sync controller 345, an RTC 350, and a tamper detection and power failure unit 355. Including the STC 340 on the SIM ICC 305, will provide a more secure source of time for SIM ICC applications.

Optionally, the WTRU 300 may be configured for use with an expanded SIM ICC 305 by including an optional TPM 360 on the SIM ICC 305. The optional TPM 360 may provide additional trust and security for SIM ICC applications as well as additional protection for data stored on the SIM ICC 305.

One of skill in the art would recognize that several other combinations and configurations are also possible, and may provide additional advantages. For example, SIM ICC may also be configured with an STC, without a TPM or the tamper detection unit. Any other embodiment that incorporated an STC onto a SIM ICC would also be considered within the scope of the invention.

In another embodiment (not pictured) the WTRU 200 of FIG. 2 and the WTRU 300 of FIG. 3 may be combined so that an STC is located on the SIM ICC and the TPM is located on the WTRU platform. The TPM on the WTRU platform can be used to protect and enhance the security of the STC inside the SIM ICC and any data that is produced by the STC.

In yet another embodiment (not pictured) the WTRU 200 of FIG. 2 and the WTRU 300 of FIG. 3 may be combined so that STC is located on the WTRU platform, and the TPM is located on the SIM ICC. In both of these additional embodiments, the WTRU will be configured to perform the same secure applications and operations described in the descriptions of FIGS. 2 and 3. It should be noted that having an STC on the SIM ICC can afford a higher level of security in terms of physical attack on the RTC itself. Additionally without a TPM on the SIM, it is not possible to secure a channel between the SIM and the platform, nor is it possible to perform mutual authentication between the platform and the SIM ICC, unless the SIM functionality is expanded to provide for either a shared key or a public/private key pair.

Figure 4:
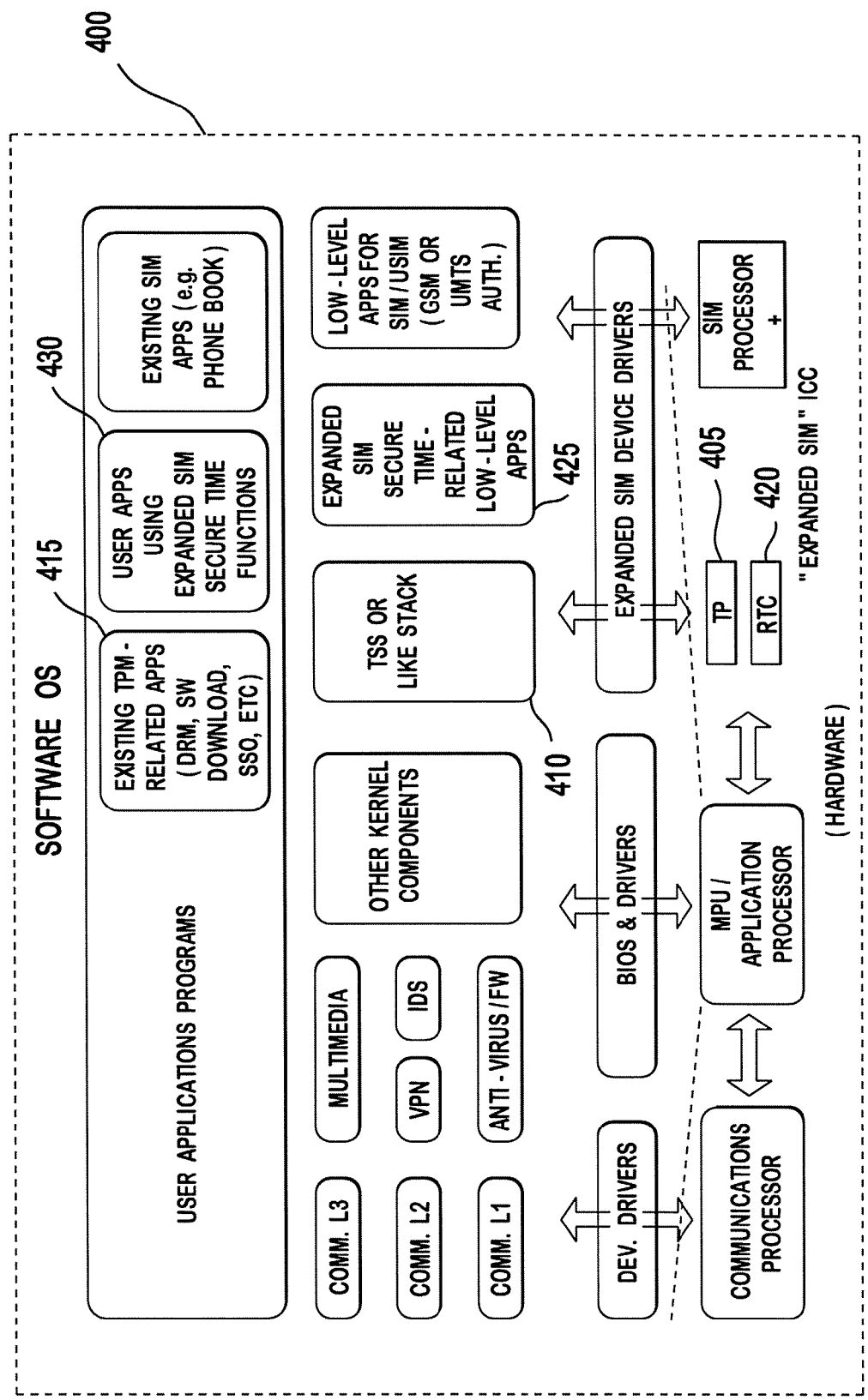
FIG. 4 shows an example of a SW architecture for a WTRU configured in accordance with the present invention.

FIG. 4 shows an example of SW architecture 400 for a WTRU configured in accordance with the present invention. The SW architecture 400 includes the existing stack components needed for operation of a TPM and a generic SIM ICC, as well as additional SW components for enabling new applications of the STC and TPM combinations. The existing stack components needed for operation of a TPM include the TPM 405, a trusted software stack (TSS) or like Stack 410, and existing TPM-related applications 415. The SW components for enabling new applications of the STC and TPM combinations include the RTC 420, an expanded SIM 425 including secure time related low-level applications, and user applications which use the expanded SIM secure time functions 430. Some of the new applications for the new architecture include, secure time stamping of messages, events, or data; secure re-synching of the STC; secure storage, retrieval, management of the time-measurement data and other related log data, and management of a time measurement and reporting mechanism involving the RTC, TPM and the SIM ICC.

Figure 5:
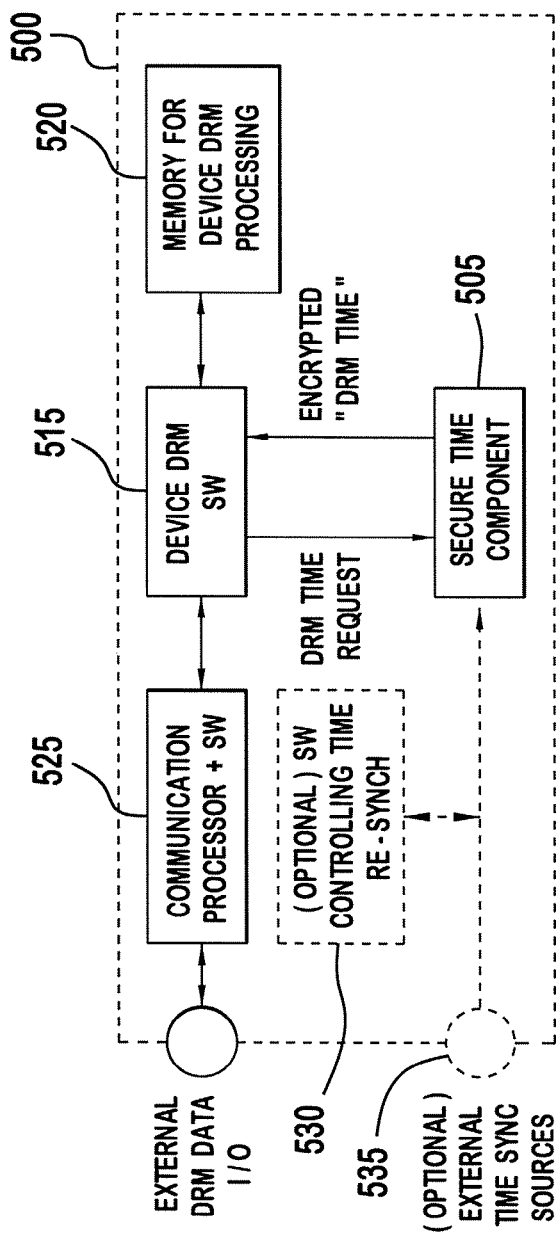
FIG. 5 shows an exemplary diagram of a DRM device configured in accordance with the present invention.

FIG. 5 shows an exemplary diagram of a DRM device 500, which may be a mobile phone, configured in accordance with the present invention. The DRM device 500 includes an STC 505, device DRM SW 515, a memory for device DRM processing 520, and a communication processor 525. Optionally, the DRM device 500 includes SW for controlling the time re-sync 530 with an external time sync source 535.

The DRM device 500 obtains a DRM time from its own STC 505 upon a request from the device DRM SW 515. Reports containing the DRM time may be sent in UTC format and may include a digital signature signed by a private key of a public key pair previously distributed by a RI DRM SW.

Optionally, the STC 505 may re-synchronize its internal clock to the external secure re-sync source 535. The external re-sync source may be a re-synchronizing signal transmitted from a secure time server. SW controlling the time re-synch function 530 may be used to control the re-synchronizing process so long as it is secure and isolated from the device DRM SW 515.

Figure 6:
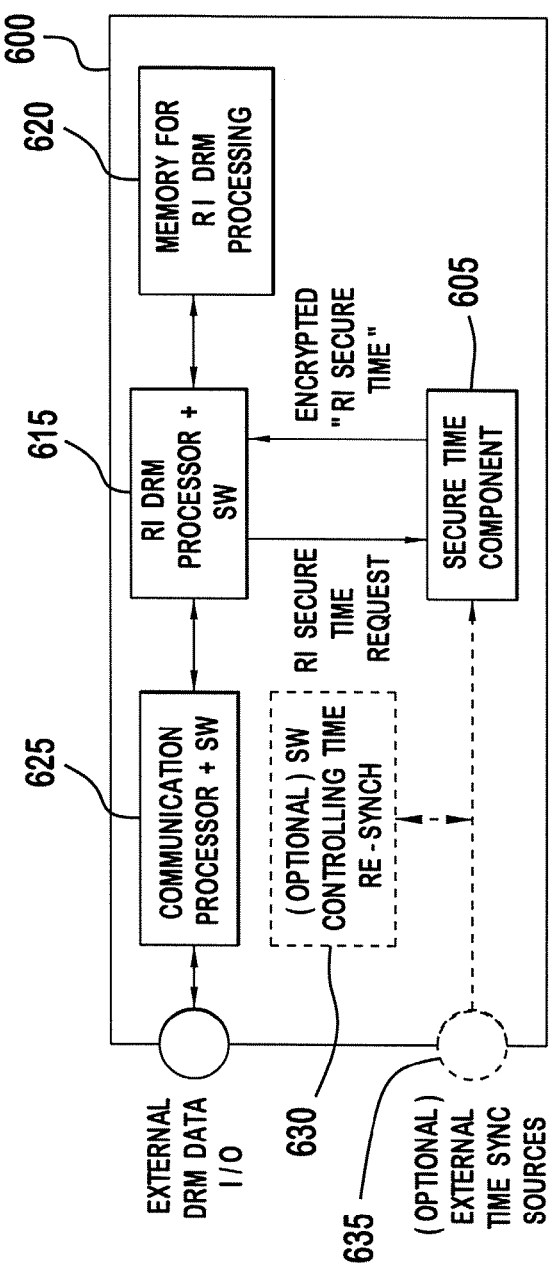
FIG. 6 shows an exemplary diagram of a DRM RI platform configured in accordance with the present invention.

FIG. 6 shows an exemplary diagram of a DRM RI platform configured in accordance with the present invention. The RI platform 600 includes an STC 605, device RI DRM processor and SW 615, a memory for RI DRM processing 620, and a communication processor 625. Optionally, the RI platform 600 includes SW for controlling the time re-sync 630 with an external time sync source 635.

The RI platform 600 is equipped with an integrated STC 605 from which it requests and receives a secure, local time measure, referred to herein simply for convenience as "RI Secure Time". The "RI Secure Time" will then be used to generate the OMA DRM specification's RI Time Stamp (RITS) described below.

The RI's DRM processor and SW 615 requests, when necessary for DRM processing (e.g. before the RI needs to send a ROAP response message to a Device), the report of the "RI Secure Time" to the STC 605 on the RI's platform 600. Immediately, the STC 605 computes the local time in UTC format by measuring its own internal, secure clock, and reports the then current time value, i.e., the "RI Secure Time" in UTC format. The STC may also include an accompanying digital signature signed by a private key of a public key pair, where the public key is pre-distributed with the RI DRM processor and SW 615 with the "RI Secure Time".

Alternatively, the time could be sent in encrypted format, thereby eliminating the need for a digital signature signed by a private key of a public key pair. In this example, upon receipt of an encrypted "RI Secure Time" from the STC 605, the RI DRM processor and SW 615 then decrypts the encrypted time message to obtain the "RI Secure Time" value. The "RI Secure Time" value can then be used for the necessary DRM processing. It should be noted that one of the ways that the decrypted "RI Secure Time" can be used is as a value for the RI time stamp (RITS) to time-stamp the ROAP RO Payload types.

It should be noted that the RI's DRM processor and SW 615 can obtain the "RI Secure Time" in UTC format but not alter it in any way. The STC 605 on the RI platform 600, optionally and if necessary, can resynchronize its internal clock to the external, secure re-sync source (such as a re-synching signal from a Secure Timing Server) 635 under the control of a piece of SW or OS on the RI 630 that is securely isolated from the RI DRM Processor and SW 615.

The "RI Secure Time" may be used to convey secure time information from the RI platform 600 to a DRM Device as a parameter in a ROAP Response messages. The current OMA DRM ROAP protocol messages include time-related information generally only from the DRM Device to the RI, in the form of the request time messages included in the four ROAP Request messages.

Also, in the current OMA DRM ROAP protocol specification there is no notion of the DRM device conveying the information on the time to the RI when a Rights Object (RO) is either examined or consumed by the device DRM processor and SW. Thus, for example, the DRM Device does not convey DRM time when a particular RO has been last invoked by the DRM SW on the device. Consequently, the RI DRM SW cannot keep track of the DRM time when the RO was used at the device.

Therefore, in another embodiment of the present invention, the ROAP protocol is modified such that, in all four ROAP Response messages, i.e., Registration Response, RO Response, Join Domain Response and Leave Domain Response messages, the RI may provide a RI Time Stamp (RITS) instead of providing the RITS only to accompany a Rights Object (RO) Payload in the RO Response message as is currently specified.

The preferred method to include the RI Time Stamp is to define it as a new mandatory parameter to be conveyed right after a Status parameter. Moreover, the RI Time Stamp information is mandatory even for response messages that are not in "success" status. This way, all Response messages will always contain a reliable measure of local time from the RI sent to a device and as a result the device can benefit from frequent opportunities to re-synchronize, if desired, its own DRM time to the RI Time Stamp.

The following Tables 1 to 4 describe, respectively, the parameters of the newly proposed modified Registration Response, RO Response, Join-Domain Response, and the Leave-Domain Response message.

TABLE 1

PARAMETERS OF PROPOSED MODIFIED "REGISTRATION RESPONSE"

| Parameter | Registration Response Status = "Success" | Status not "Success" | Notes |
|---|---|---|---|
| Status | Mandatory | Mandatory | Indicates Device Hello handling was success or not |
| RI Time Stamp | Mandatory | Mandatory | Newly proposed parameter |
| Session ID | Mandatory | — | Protocol session ID set by the RI |
| Selected Version | Mandatory | — | Min (Device suggested ROAP version, highest RI supported ROAP version) |
| RI ID | Mandatory | — | Only currently defined ID is hash of RI's public key info, as appearing in certificate for RI |
| Selected Algorithm | Mandatory | — | Cryptographic algorithms to use in subsequent ROAP interactions |
| RI Nonce | Mandatory | — | Random nonce sent by the RI |
| Trusted Device Authorities | Optional | — | List of Device trust anchors recognized by the RI. |
| Server Info | Optional | — | <=512 byte Server-specific info Device must return unchanged in Registration Request later. |
| Extensions | Optional | — | Peer Key Identifier, Certificate Caching, Device Details: by including this, RI requests Device to return Device-specific info in subsequent Registration Request message. |
| Signature | Mandatory | — | SHA-1 Signature of Registration Request message + Registration Response using RI's private key |

TABLE 2

PARAMETERS OF THE PROPOSED MODIFIED "RO RESPONSE" MESSAGE

| Parameter | Status = "Success" | Status not "Success" | Notes |
|---|---|---|---|
| Status | M | M | Indicate if request was handled successfully or not |
| RI Time Stamp | Mandatory | Mandatory | Newly proposed parameter |
| Device ID | M | — | Identifies the requesting Device. Must be same as in ROAP_RORequest. Must terminate if not. |
| RI ID | M | — | Identifies the RI. In the 2-pass, MUST equal RI ID in preceding RO Request. In 1-pass RO Response, MUST equal the stored RI ID. |
| Device Nonce | M | — | MUST have same value as in the ROAP-RORequest. |
| Protected RO's | M | — | RO's in which sensitive info (such as CEK's) are encrypted |
| Cert. Chain | O | — | Same as in Registration Response |
| OCSP Response | O | — | Complete set of OCSP responses for the RI's certificate chain |
| Extensions | O | — | Transaction Identifier - allows RI to provide Device with info for tracking transactions |
| Signature | M | — | Sig (RORequest ∥ ROResponse message - Signature) using RI's private key |

TABLE 3

MESSAGE FORMAT OF "JOINDOMAIN RESPONSE"

ROAP-JoinDomainResponse

| Parameter | Status = "Success" | Status is NOT "Success" |
|---|---|---|
| Status | Mandatory | Mandatory |
| RI Time Stamp | Mandatory | Mandatory |
| Device ID | Mandatory | — |
| RI ID | Mandatory | — |
| Device Nonce | Mandatory | — |
| Domain Info | Mandatory | — |
| Certificate Chain | Optional | — |
| OCSP Response | Optional | — |
| Extensions | Optional | — |
| Signature | Mandatory | — |

TABLE 4

MESSAGE FORMAT OF "JOINDOMAIN RESPONSE"

ROAP-JoinDomainResponse

| Parameter | Status = "Success" | Status is NOT "Success" |
|---|---|---|
| Status | Mandatory | Mandatory |
| RI Time Stamp | Mandatory | Mandatory |
| Device Nonce | Mandatory | — |
| Domain Identifier | Mandatory | — |
| Extensions | Optional | — |
| Signature | Mandatory | — |

Figure 7:
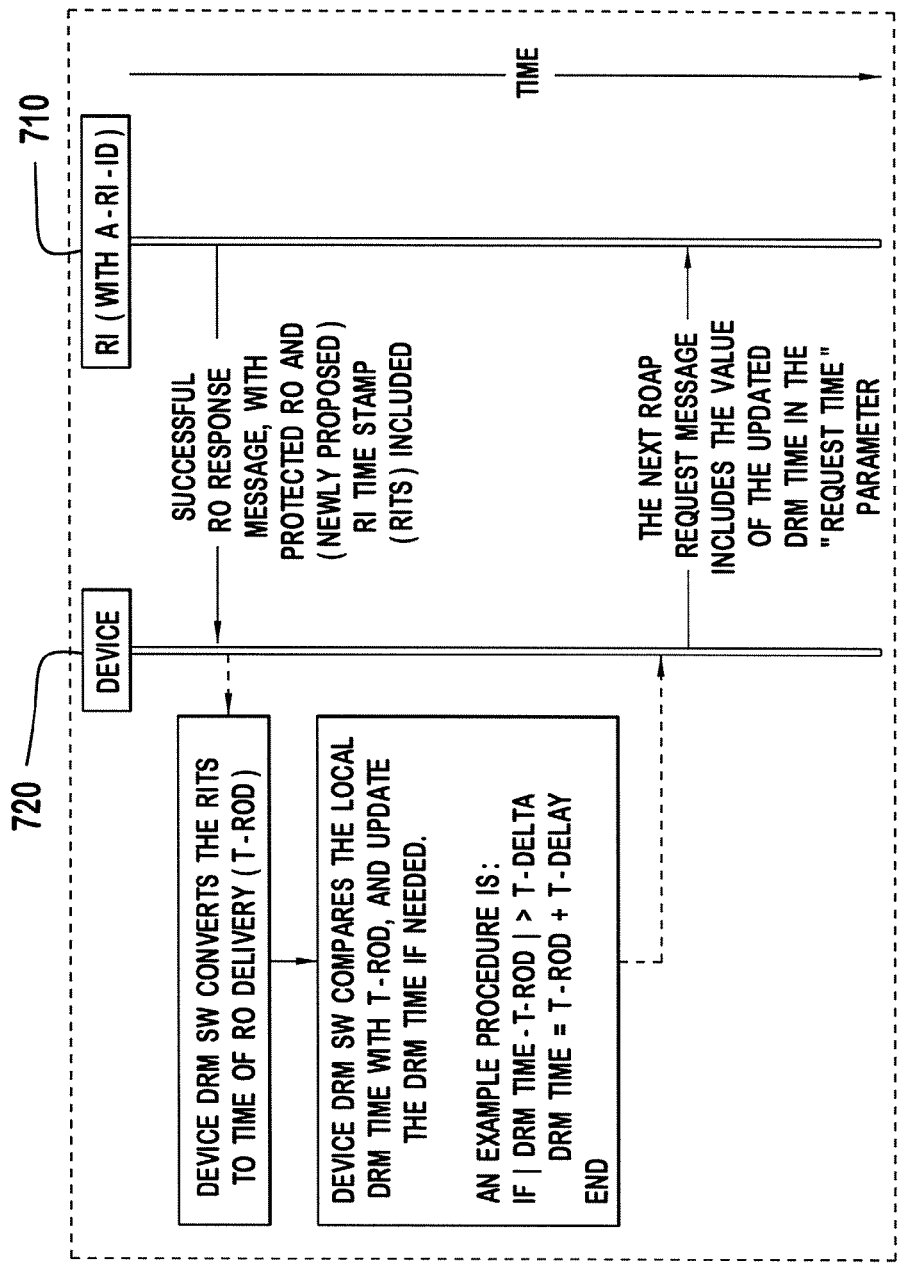
FIG. 7 shows an exemplary signal diagram for the generation of and use of a proposed DRM parameter.

FIG. 7 shows an exemplary signal diagram for the generation of and use of a parameter, "Time of RO Deliver" (T-ROD). In FIG. 7, the RITS that a DRM device 720 receives in a RO Response message also includes a protected RO, in the form of a "Protected RO" parameter, that the RITS is converted into and stored by the device DRM 720 SW as a separately stored and maintained entity T-ROD.

Upon generation of a new T-ROD, the device DRM 720 SW shall examine its local time measure, i.e., the DRM time, and use the T-ROD to estimate whether the DRM time is asynchronous from the true time. If it determines that the DRM time is sufficiently incorrect, i.e., for example if the absolute value of the difference between DRM time and T-ROD exceeds a threshold T-delta, then the device shall re-synchronize the DRM time to T-ROD+T-delay, where T-delay is an estimated delay covering the communication and processing of T-ROD and comparison of T-ROD to the most current DRM time. Upon receipt of a T-ROD, and upon finding that its own local time is sufficiently different from the T-ROD, the DRM device re-synchronizes its local DRM time.

Figure 8:
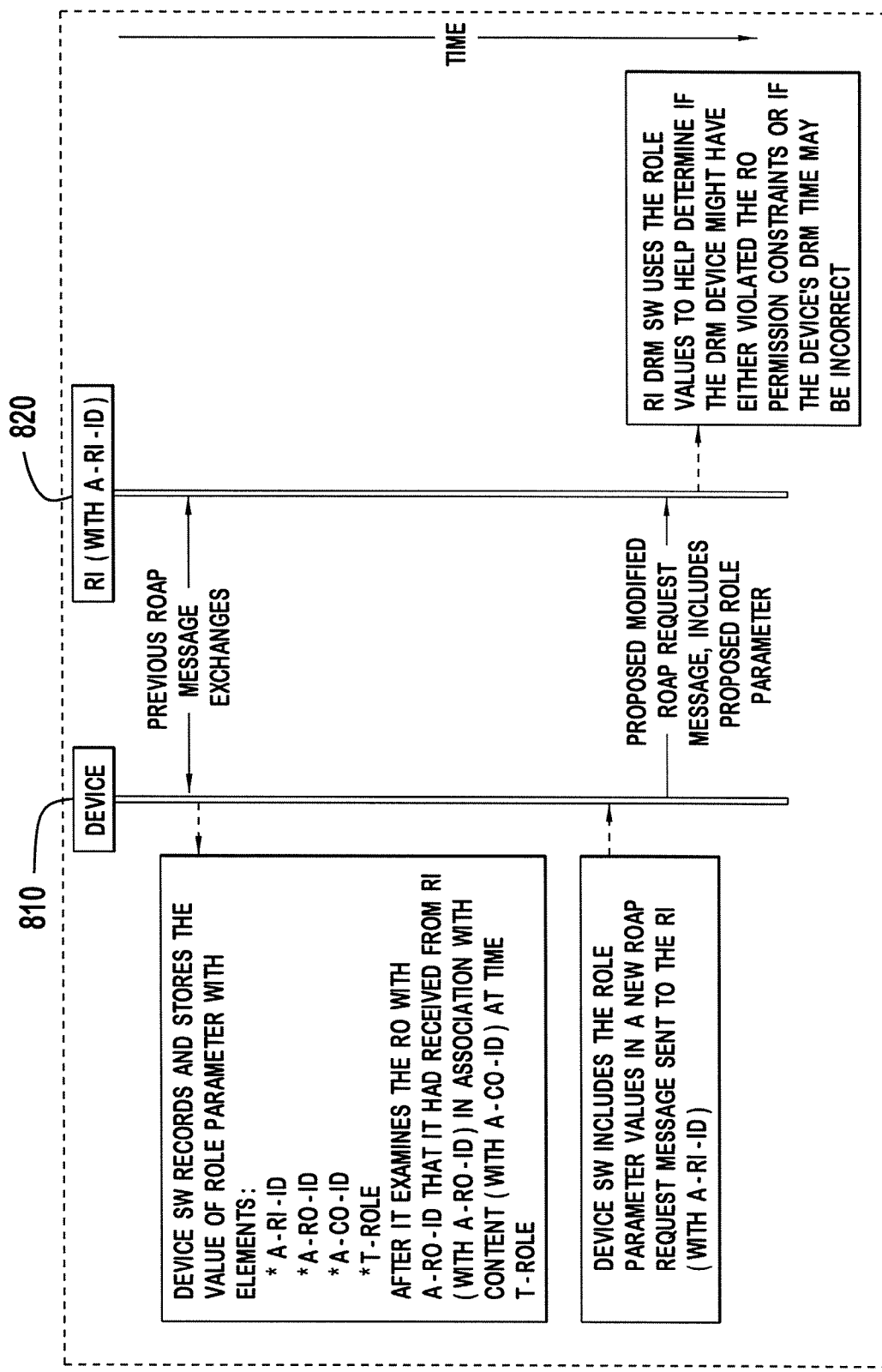
FIG. 8 shows an exemplary signal diagram for the generation of and use of another proposed DRM parameter.

FIG. 8 shows an exemplary signal diagram for the generation of and use of a parameter, "Time an RO was Last Examined (T-ROLE)". In FIG. 8, reporting a T-ROLE in all ROAP Request messages sent to a RI already known to a device is needed. This can be achieved by modifying the OMA DRM 2.0 so that a DRM device 810 may record a time, as measured by the DRM Time of the event that a particular RO, from a particular RI 820, was last examined in association with a particular content object. And, then the DRM device 810 stores these values as elements of a newly proposed parameter ROLE (RO Last Examined) for later use.

The element of ROLE for the time of such event as described above is proposed to be called the T-ROLE (standing for Time the RO was Last Examined) and is captured by the reported DRM time of such an event in UTC format. Hence, the recorded ROLE parameter has the following elements: A-RI-ID (RI-ID of the RI that had sent the just-examined RO); A-CO-ID (ContentID of the Content associated with the examined RO); A-RO-ID (ID of the Rights Object just examined); and T-ROLE (DRM time when the RO with A-RO-ID was last examined).

The DRM device 810 also reports the newly proposed ROLE parameter to the RI 820 with A-RI-ID whenever it needs to send another ROAP Request message. The following Table 5, Table 6, Table 7, and Table 8, respectively, describe the formats of ROAP Request messages that include the ROLE parameter defined above.

TABLE 5

MESSAGE FORMAT OF "REGISTRATION REQUEST" WITH NEW PARAMETER ROLE

| Parameter | Mandatory/ Optional | Notes |
|---|---|---|
| Session ID | M | Same as Session ID of preceding ROAP-RIHello message, otherwise RI SHALL terminate the Reg. protocol |
| Device Nonce | M | Nonce chosen by the Device. |
| Request Time | M | Current DRM Time as measured by the Device |
| RO Last Examined | M | New parameter: ROLE values (A-RI-ID, A-RO-ID, A-CO-ID, T-ROLE) |
| Certificate Chain | O | A certificate chain including the Device's cert but not the root certificate. |
| Trusted RI Authorities | O | List of RI Trust Anchors recognized by the Device. |
| Server Info | O | Same as Server Info previously sent in RIHello. |
| Extensions | O | Peer Key Identifier; No OCSP Response; OCSP Responder Key Identifier; Device Details |
| Signature | M | SHA-1 Signature of data sent so far in the protocol. Excludes the Signature element itself. Made using device's private key |

TABLE 6

MESSAGE FORMAT OF "RO REQUEST" WITH NEW PARAMETER ROLE

| Parameter | Mandatory/ Optional | Notes |
|---|---|---|
| Device ID | M | Identifies requesting Device |
| Domain ID | O | When present, identifies the Domain |
| RI ID | M | Authorizing RI ID. Same value as in Reg.Response |
| Device Nonce | M | Nonce chosen by Device. |
| Request Time | M | Current DRM Time, as seen by the Device |
| RO Info | M | Id's of the requested RO('s), also optional hash of DCF |
| RO Last Examined | M | New parameter: ROLE values (A-RI-ID, A-RO-ID, A-CO-ID, T-ROLE) |
| Certificate Chain | O | Sent unless RI Context indicates Dev has necessary certificate information. Must include Dev Certificate |
| Extensions | O | Peer Key Identifier; No OCSP Response; OCSP Responder Key Identifier; Transaction ID |
| Signature | M | SHA-1 signature of (RO request message - Signature element) |

TABLE 7

MESSAGE FORMAT OF "JOINDOMAIN REQUEST

| Parameter | Mandatory/Optional |
| --- | --- |
| Device ID | M |
| RI ID | M |
| Device Nonce | M |
| Request Time | M |
| Domain Identifier | M |
| RO Last Examined | M |
| Certificate Chain | O |
| Extensions | O |
| Signature | M |

TABLE 8

MESSAGE FORMAT OF "LEAVEDOMAIN REQUEST

| Parameter | Mandatory/Optional |
| --- | --- |
| Device ID | M |
| RI ID | M |
| Device Nonce | M |
| Request Time | M |
| Domain Identifier | M |
| RO Last Examined | M |
| Certificate Chain | O |
| Extensions | O |
| Signature | M |

The ROLE information may be used by the RI 820 that receives it in the proposed modified ROAP Request messages to help determine if a device's DRM time is incorrect, as well as to determine if a DRM device 810 might have violated usage rights permitted in the RO (with A-RO-ID) Permission Constraints. For the definitions of the Permission Constraint elements see the OMA DRM Rights Expression Language (REL) specification v2.0.

Figure 9:
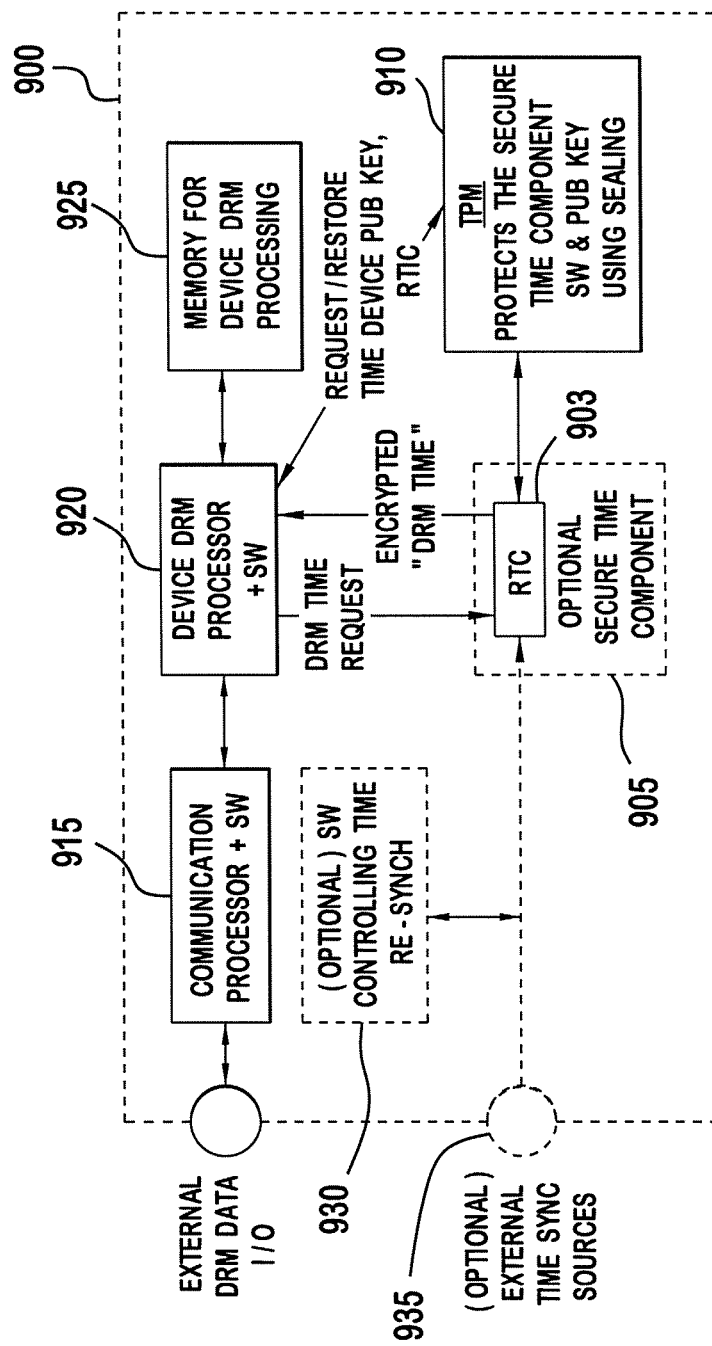
FIG. 9 shows an exemplary diagram of a DRM device configured in accordance with the present invention.

FIG. 9 shows an exemplary diagram of a DRM device 900 configured in accordance with the present invention. The DRM device 900 includes an RTC 903, which may optionally be included in an STC 905, a TPM 910, a communication processor and SW 915, a device DRM processor and SW 920, and a memory for device DRM processing 925. Optionally, the DRM device 900 may include SW for controlling the time re-sync 930 with an external time sync source 935.

Referring to FIG. 9, the present invention includes several methods whereby security of some of the DRM time-related information can be strengthened by use of the TPM 910. Typically, the RTC 903 will report the measured local time, i.e., the DRM time, to the DRM processor and SW 920 when the DRM processor and SW 920 requests the time-reporting from the RTC 903.

In the first case, the RTC 903 can be just an ordinary, unprotected clock and time-reporting SW. In the second case, the RTC 903 can be an element in an STC 905 that has higher trustworthiness compared to an unprotected RTC 903. The following embodiments are related to the first case, and are intended to bolster the security of time-related information when the DRM device 900 is not necessarily equipped with a STC.

In another embodiment, periodic and event-driven run-time integrity check (RTIC) of the RTC 903 on the DRM Device 900 equipped with an unprotected RTC is performed. The DRM Device 900 equipped with an unprotected RTC 903 should perform a Run-Time Integrity Check (RTIC) of the RTC's 903 hardware and SW. The following two methods for such RTIC may be performed.

First, the DRM device processor and SW 920 perform an RTIC of the RTC hardware and SW on a regular basis. Since any 'time reading' of the RTC 903 to be used as a basis of such 'regularity' of the RTIC, such a time reading itself could be vulnerable to attacks by a malignant process or entity, 'regular' checks of the RTC may be performed. Therefore, these regular checks should not be based on time-readings from the unprotected RTC 903, but instead based on a synchronization signal from a dependable and unalterable external time source 935 such as a network-originated time update signal.

As an example, the following is an exemplary method by which the DRM device 900 can perform RTIC of the RTC 903 on a regular, quasi-periodic basis, using the time-updates provided by a reliable external source 935 such as the network timing server and also the security provided by the TPM 910 onboard the DRM device 900.

The DRM device 903 is first configured to store a protected value T-Period pre-stored either in secured ROM or in the RAM under TPM-protection. This value determines the period between successive run-time integrity checks of the RTCs. After the DRM device 900 is first booted-up and it achieves a first network connection to the external time source 935, the DRM device runs an RTIC of the RTC 903, then measures the current time from the RTC 903, and stores that time value under a TPM Bind or Seal command. This stored value is stored as T1.

Every time the DRM device 900 gets secure updated time from the network timing server, the obtained updated time value, T2, is compared to T1. If T2 lags T1 by equal to or more than T-Period, but not more than two times T-Period, then the DRM device 900 performs another RTIC of the RTC 903. The T1 value is then discarded and replaced by the new value of T2. Note that every time the device 900 obtains the secure time update from the network, it will also update its RTC 903 to the value from the network.

Secondly, the DRM Device SW performs an RTIC of the RTC's HW and SW on or before the onset of certain events. These events may be: powering of the DRM device 900; boot-up of the device DRM processor and SW 920; first network connection after boot-up; upon the DRM device 900 making a call over the network; upon the DRM device 900 receiving a call over the network; after the DRM device 900 re-connects to a communications network after having been disconnected from such a network; or the number of times the RTC 903 time has been reset or assessed, in comparison to a securely obtained network time, to be incorrect exceeds a certain pre-set threshold.

If and when any RTIC of the RTC fails, the device DRM processor and SW 920 could perform several actions to repair or raise the security level. A few examples, of actions performed by the DRM processor and SW 920 are as follows: the device DRM processor and SW 920 may an alarm to the human user; the device DRM processor and SW 920 could stop allowing the user to consume any or a selected sub-set of content; the device DRM processor and SW 920 could ask the device's platform OS a request to update the device DRM processor and SW 920 to an external update source that is certifiable such as the network time; the device DRM processor and SW 920 could limit some other services by sending a ROAP Request message to a RI and then obtaining in the corresponding Response message the RITS.

In another embodiment, the DRM device 900, periodically, or on event-driven basis, stores the DRM time using TPM Bind or Seal commands, and later restores and verify this DRM time value against a newly-reported DRM time value. The device DRM processor and SW 920 requests the service of the on-board TPM to securely store a current DRM time from the RTC. Then, either on a quasi-periodic basis, or upon onset of a trigger event, the device DRM processor and SW 920 restores the previously stored DRM Time. Next, the device DRM processor and SW 920 determines whether the current DRM time is ahead of the value of the DRM time restored from the TPM-controlled memory.

In another embodiment of the present invention, the DRM device 900 periodically verifies a current DRM time with comparison to the "last known good time" previously stored securely by the TPM. Alternatively, other reference time values could be used for comparison, such as the last-known RITS, the OCSP "producedAt" component, or the newly proposed T-ROD. Each of these values may be stored by the TPM 910 and periodically, be restored and used to verify the validity of the then-current DRM Time obtained from the Device's RTC. Alternatively, the additional values stored by the TPM 910 may be used for verification at certain events such as boot up, or when the device DRM processor and SW 920 are updated.

In the embodiments that follow, it is assumed that the RTC 903 is contained in an STC 905 as shown in FIG. 9. The following embodiments are methods that, by combining the functionality of a TPM, further strengthen the time-information security provided by even a STC 905.

In an alternative embodiment, the TPM 910 is utilized for time-requestor authentication and integrity-check of the STC on a DRM device 900. The security of an STC 905 as described above can be further strengthened, in the context of a device DRM application, by using the functionality that a TPM 910 can provide.

Whenever the STC 905 is requested by the device DRM processor and SW 920 to report its time, the STC 905 first authenticates the trustworthiness of the service requester, the DRM processor and SW 920, by running a TPM-managed integrity check. Further, whenever any application requests the STC 905 to reset its time, the STC 905 first authenticates the trustworthiness of the service requester by running TPM-managed integrity check of the requesting SW.

Additionally, the public key that can decrypt the DRM Time information encrypted by the STC 905 is under cryptographic protection by the TPM 910 using a TPM Sealing command. In this manner, the only way a malicious process can get the DRM time information is by hacking both the STC 905 and the TPM-protected data.

In another embodiment of the present invention, a TPM may be utilized on a RI Platform to strengthen the security of time information. Many of the method detailed in the description of FIG. 9 applied, to a RI platform configured with both an STC and a TPM.

In another embodiment a RI platform equipped with an RTC and a TPM may perform run-time integrity check (RTIC) of the RTC HW/SW on a periodic or event-driven basis.

In another embodiment a RI platform equipped with an RTC and a TPM to securely store, periodically or on event-driven basis, the RITS using TPM Bind or Seal commands, and later restore and verify this RITS value against the newly reported RITS values.

The RI platform equipped with an RTC and a TPM may perform periodic verification of the then-current RITS with comparison to the "last known good Time" previously obtained from a trusted external source (e.g. a trusted OCSP responder) and then subsequently stored securely under the TPM control.

The RI platform equipped with a STC and a TPM may perform a periodic, or event-driven, integrity check of the secure time service and also may enable the STC to authenticate the requestor of the time request service by use of the TPM.

In another embodiment, the present invention provides a method for controlling access to Functions of Time-related Resources and Applications for 'calling DRM Applications'. Certain functions of HW and SW resources that deal with measurement, report, and storage of time-related information on a DRM Device or a RI are granted on the basis of 'trust policies' pre-configured for the DRM SW or, for that matter, any application that calls for such access or action on the said HW and SW resources dealing with Time processing.

Thus, access rules, actions and outputs of the time-related HW and SW resources may be pre-classified as 'functional elements' of a DRM Device (or a Rights Issuer platform). For example, functions and actions governing an STC, such as request to update the Secure Time Component SW, the RTC, or a request for network-timing protocol (NTP) based timing re-synchronization. Additionally, functions governing the storage of time-related information, may also be preclassified as functional elements of a DRM device. One of skill in the art would recognize that other functions or resources could be predefined as access-controlled 'functional elements' as well.

Particular access rights to the pre-defined functions (listed as Functional Elements) of time-related HW and SW resources are granted to any and all SW applications residing on the DRM Device (or a RI Platform) (including the DRM SW application) only according to a pre-set ' access privilege' rules and a certain status or condition of each of such 'calling applications'. For example, the policy file may include a rule, among possibly many others, that any SW or application (including the DRM SW application) that asks for an update, shall itself first have been integrity-checked against a known and pre-certified metric.

It should be noted that while these secure time concepts are described for a DRM device, they may be equally applied, by someone skilled in the art, to any device which requires the delivery of secure time. Examples of such devices include devices that perform electronic ticketing or electronic payments.

While several of the methods described above are directed towards a DRM Agent application in a device with DRM capabilities, one of skill in the art would recognize that the concepts may be generalized to a mobile device with TPM capabilities to secure the RTC for services other than DRM content such as financial transactions or enterprise DRM applications.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed:

1. A wireless communications device comprising:
   a clock for maintaining a current time value, the clock resuming counting from a fixed date and time upon restoration of power to the wireless communications device;
   a secure time component (STC) comprising a memory protected by a trusted platform module (TPM), the STC being further configured to retrieve from the protected memory a last saved time when the wireless communications device was active before a current restoration of power to the wireless communications device; and
   the STC being further configured to restore the clock to the last saved time value when the current time of the clock is less than the last saved time.

2. The wireless communications device of claim 1, wherein the TPM is further configured to perform an integrity check of the clock.

3. The wireless communications device of claim 2, wherein the TPM is further configured to perform integrity checks of the clock on a periodic basis.

4. The wireless communications device of claim 1, wherein the wireless communications device is configured to re-synchronize the clock with a secure time server to which the wireless communication device communicates with via a network.

5. The wireless communications device of claim 4, wherein the STC is configured to save the clock value obtained from a secure time server securely under TPM control.

6. The wireless communications device of claim 1, wherein the wireless communications device is configured to securely save under TPM control the time value obtained from a trusted external time source during communications with the trusted external time source.

7. The wireless communications device of claim 6, wherein the device is configured to compare a current time value of the clock to a time value previously stored securely under TPM control; and wherein the STC is further configured to set the clock to the saved time value when the current time of the clock is ahead of the saved time value retrieved from the memory protected by the TPM by an amount that exceeds a predetermined threshold.

8. The wireless communications device of claim 6, wherein the device is configured to compare a current time value of the clock to a time value previously stored securely under TPM control; and wherein the STC is further configured to restore the clock to the saved time value when the current time of the clock is less than the value from the trusted external time source.

9. In a wireless communications device comprising a clock, which resumes counting from a fixed date and time upon restoration of power to the wireless communications device, and a secure time component (STC) comprising a memory protected by a trusted platform module (TPM), a method for secure time processing comprising:
   maintaining, by the clock, a current time value;
   retrieving, by the STC, from the protected memory, a last saved time when the wireless communications device was active before a current restoration of power to the wireless communications device; and
   restoring, by the STC, the clock to the last saved time value when the current time of the clock is less than the last saved time.

10. The method of claim 9, further comprising performing, by the TPM, an integrity check of the clock.

11. The method of claim 10, further comprising performing, by the TPM, integrity checks of the clock on a periodic basis.

12. The method of claim 9, further comprising re-synchronizing the clock with a secure time server to which the wireless communication device communicates with via a network.

13. The method of claim 12, further comprising saving, by the STC, the clock value obtained from a secure time server securely under TPM control.

14. The method of claim 9, further comprising securely saving under TPM control the time value obtained from a trusted external time source during communications with the trusted external time source.

15. The method of claim 14, further comprising:
   comparing a current time value of the clock to a time value previously stored securely under TPM control; and
   setting, by the STC, the clock to the saved time value when the current time of the clock is ahead of the saved time value retrieved from the memory protected by the TPM by an amount that exceeds a predetermined threshold.

16. The method of claim 14, further comprising:
   comparing a current time value of the clock to a time value previously stored securely under TPM control; and
   restoring, by the STC, the clock to the saved time value when the current time of the clock is less than the value from the trusted external time source.

* * * * *